(12) United States Patent
Shishime et al.

(10) Patent No.: US 8,919,303 B2
(45) Date of Patent: Dec. 30, 2014

(54) MULTI-CYLINDER SPARK IGNITION ENGINE

(75) Inventors: Kouji Shishime, Hiroshima (JP); Junsou Sasaki, Hiroshima (JP); Hideki Omori, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 13/818,051

(22) PCT Filed: Jun. 27, 2011

(86) PCT No.: PCT/JP2011/003650
§ 371 (c)(1),
(2), (4) Date: Feb. 20, 2013

(87) PCT Pub. No.: WO2012/026059
PCT Pub. Date: Mar. 1, 2012

(65) Prior Publication Data
US 2013/0152901 A1    Jun. 20, 2013

(30) Foreign Application Priority Data
Aug. 21, 2010  (JP) ................................. 2010-185685

(51) Int. Cl.
| | |
|---|---|
| F02B 75/04 | (2006.01) |
| F02D 15/00 | (2006.01) |
| F02D 13/02 | (2006.01) |
| F02P 5/04 | (2006.01) |
| F02D 41/00 | (2006.01) |
| F02P 5/152 | (2006.01) |

(52) U.S. Cl.
CPC .................. *F02B 75/04* (2013.01); *F02P 5/045* (2013.01); *F02D 2200/10* (2013.01); *F02D 41/006* (2013.01); *F02P 5/152* (2013.01); *Y02T 10/18* (2013.01); *F02D 15/00* (2013.01); *F02D 13/02* (2013.01)
USPC ...................... 123/48 R; 123/58.7; 123/73 AC

(58) Field of Classification Search
CPC ............ F02D 13/0203; F02D 13/0234; F02D 13/0257; F02D 15/00; F02D 2250/18
USPC ....... 123/48 R, 48 A, 58.7, 73 AC, 78 R, 78 A
See application file for complete search history.

(56) References Cited

U.S. PATENT DOCUMENTS

| | | | |
|---|---|---|---|
| 5,785,027 A | * | 7/1998 | Chabry .................... 123/184.24 |
| 6,564,763 B2 | * | 5/2003 | Shiraishi et al. ........... 123/90.15 |

(Continued)

FOREIGN PATENT DOCUMENTS

| | | |
|---|---|---|
| JP | H03-29400 A | 2/1991 |
| JP | 09-041978 A | 2/1997 |

(Continued)

OTHER PUBLICATIONS

International Search Report; PCT/JP2011/003650; Jul. 19, 2011.

(Continued)

*Primary Examiner* — Noah Kamen
*Assistant Examiner* — Long T Tran
(74) *Attorney, Agent, or Firm* — Studebaker & Brackett PC

(57) ABSTRACT

An exhaust manifold has a plurality of branched exhaust passages connected to respective exhaust ports of individual cylinders; a plurality of first collector segments each of which joins the branched exhaust passages for the cylinders which are not adjacent in the exhaust order sequence; a plurality of middle exhaust passages connected to the downstream of the first collector segments, respectively; and a second collector segment that joins the middle exhaust passages. In at least low and middle speed ranges in a high load region of the engine, a valve opening time of an exhaust valve is changed according to the engine speed so that a predetermined amount of a valve overlap period is ensured and that negative pressure waves from exhaust pressure pulses reach an exhaust port during the valve overlap period in a plurality of engine speed ranges.

12 Claims, 13 Drawing Sheets

(56) References Cited

U.S. PATENT DOCUMENTS

| | | | |
|---|---|---|---|
| 7,392,795 B2* | 7/2008 | Nagamine et al. | 123/536 |
| 7,481,199 B2* | 1/2009 | Nakamura | 123/345 |
| 7,493,890 B2* | 2/2009 | Etou et al. | 123/406.29 |
| 2006/0169246 A1* | 8/2006 | Asai | 123/305 |
| 2007/0255487 A1* | 11/2007 | Etou et al. | 701/105 |
| 2008/0092834 A1* | 4/2008 | Stein et al. | 123/90.15 |
| 2009/0159045 A1* | 6/2009 | Hitomi et al. | 123/406.58 |
| 2009/0216427 A1* | 8/2009 | Yamakawa et al. | 701/103 |
| 2010/0077990 A1* | 4/2010 | Shishime et al. | 123/299 |
| 2011/0041786 A1* | 2/2011 | Goto et al. | 123/90.15 |

FOREIGN PATENT DOCUMENTS

| | | |
|---|---|---|
| JP | 3678861 B2 | 8/2005 |
| JP | 2005-235952 A | 9/2005 |
| JP | 2010-084530 A | 4/2010 |
| JP | 2010-084599 A | 4/2010 |
| WO | 00/16602 A1 | 3/2000 |

OTHER PUBLICATIONS

The extended European search report issued by the European Patent Office on Jun. 30, 2014, which corresponds to EP13003635.3-1803 and is related to U.S. Appl. No. 13/818,051.

* cited by examiner

MULTI-CYLINDER SPARK IGNITION ENGINE

TECHNICAL FIELD

The present invention relates to a multi-cylinder spark ignition engine mounted on, for example, automobiles.

BACKGROUND ART

Conventional spark ignition engines are known whose torque is improved by using exhaust pressure pulses. In this type of engines, a valve overlap period during which intake and exhaust valves are kept open is made and negative pressure waves from the exhaust pressure pulses is induced to reach an exhaust port during the valve overlap period over an engine operation region in which torque should be increased, improving the effectiveness of the scavenging action.

For example, Patent Document 1 describes to make phases of the valve overlap period changeable and timing of a negative pressure wave is adjusted so that it reaches an exhaust port during a valve overlap period.

In addition, Patent Document 2 describes to provide valve opening time changing means which makes a valve opening time of an exhaust valve changeable, and to control the valve opening time changing means according to the engine speed so that negative pressure waves from exhaust pressure pulses reach an exhaust port during a valve overlap period, thereby improving the effectiveness of the scavenging action and improving the torque over a wide rotation speed range of the engine.

CITATION LIST

Patent Literature

[PTL 1]
Japanese Patent No. 3678861
[PTL 2]
Japanese Patent Application Laid-Open No. 2010-84530

SUMMARY OF INVENTION

Technical Problem

A higher compression ratio is helpful in raising thermal efficiency of the engine to improve fuel efficiency. However, spark ignition engines in which gasoline or a fuel containing gasoline is used have following problems when operated at a high compression ratio such as a geometric compression ratio of higher than 12.

In high compression ratio engines, higher thermal efficiency of the engine can improve fuel efficiency and provide a possible increase in torque. However, knocking occurs more easily in low and middle speed ranges in a high engine load region. In order to reduce knocking, the effective compression ratio may be reduced or the ignition timing may be retarded significantly. These approaches, even when applied, cannot ensure an appropriately high torque. This means that sufficiently high torque cannot be obtained due to countermeasures against knocking.

The Patent Documents 1 and 2 focus neither on countermeasures to prevent knocking in such a high compression ratio engine nor on problems associated therewith.

With respect to the circumstances as described above, an object of the present invention is to provide a multi-cylinder spark ignition engine with which knocking can be reduced in an effective manner in low and middle speed ranges in a high load region of the high compression ratio engine and a high torque can be achieved by keeping the compression ratio high.

Solution to Problem

In order to achieve the above object, the present invention relates to a spark ignition engine with four or more cylinders into which a fuel containing at least gasoline is injected. This engine has a geometric compression ratio of higher than 12, and comprises an exhaust manifold connected to respective exhaust ports of individual cylinders, a variable exhaust valve timing mechanism for changing a valve opening time of an exhaust valve, an ignition timing controller for controlling an ignition timing of a spark plug provided in each cylinder, and an effective compression ratio adjuster for adjusting an effective compression ratio. The exhaust manifold comprises a plurality of branched exhaust passages connected to the respective exhaust ports of the individual cylinders, a plurality of first collector segments each of which joins the branched exhaust passages for the cylinders which are not adjacent in the exhaust order sequence, a plurality of middle exhaust passages connected to the downstream of the first collector segments, respectively, and a second collector segment that joins the middle exhaust passages. In at least low and middle speed ranges in a high load region of the engine, an effective compression ratio is adjusted to have a value larger than 10 by the effective compression ratio adjuster, and the ignition timing is retarded by a predetermined amount from the MBT by the ignition timing controller. In addition, in the aforementioned engine operation region, the valve opening time of the exhaust valve is changed according to the engine speed by the variable exhaust valve timing mechanism so that a predetermined amount of a valve overlap period of an intake valve and the exhaust valve is ensured in a case where the valve opening time and the valve closing time of the intake and exhaust valves are defined with the valve lift of 0.3 mm, and that the negative pressure waves from the exhaust pressure pulses reach an exhaust port of a cylinder during the valve overlap period of that cylinder in a plurality of engine speed ranges.

Advantageous Effects of Invention

With the multi-cylinder spark ignition engine according to the present invention, by effectively utilizing the exhaust pressure pulses and thereby improving the effectiveness of the scavenging action in low and middle speed ranges in the high load region of the high compression ratio engine, an intake volumetric efficiency is increased and retard amount of the ignition timing is reduced while keeping the effective compression ratio high. This makes it possible to significantly increase the torque.

DESCRIPTION OF EMBODIMENTS

An embodiment of an exhaust assembly in a multi-cylinder spark ignition engine according to the present invention is described with reference to the drawings.

Figure 1:
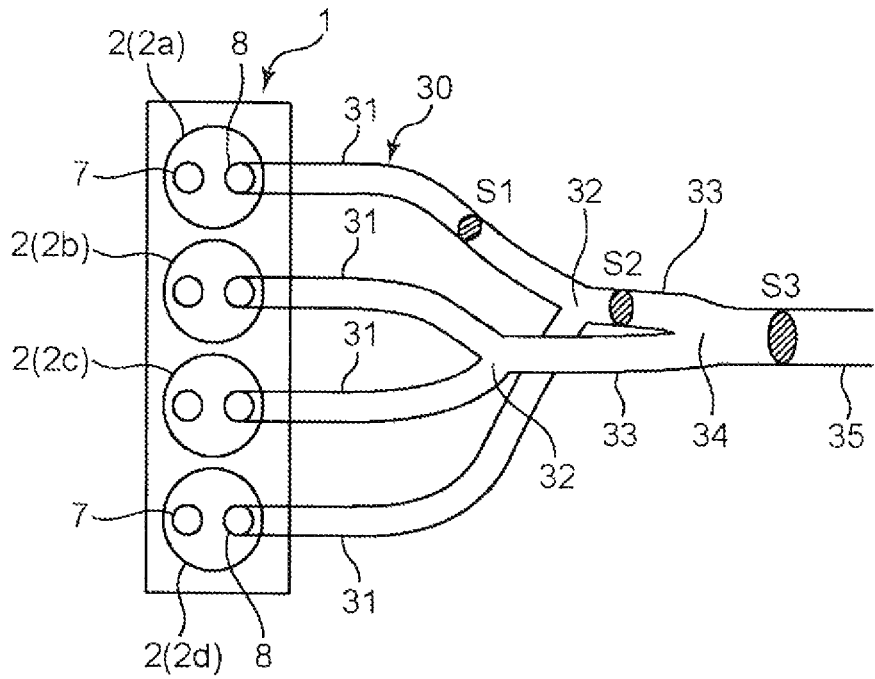
FIG. 1 is a schematic plan view of an engine body and an exhaust manifold in a multi-cylinder spark ignition engine according to an embodiment of the present invention.
Figure 2:
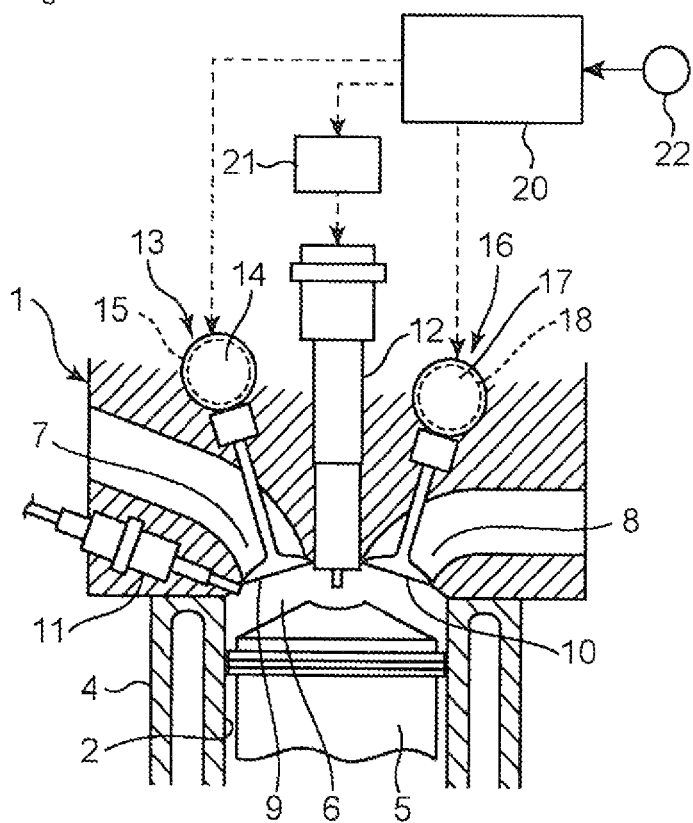
FIG. 2 is a schematic cross-sectional view of the engine body.

FIG. 1 schematically shows an engine body 1 and an exhaust manifold 30 in the multi-cylinder spark ignition engine. FIG. 2 schematically shows a cross section of the engine body 1. The engine according to the present invention is a multi-cylinder spark ignition engine with four or more cylinders into which gasoline or a fuel containing gasoline is injected. In this embodiment, this is a serial four-cylinder spark ignition engine. More specifically, as shown in FIG. 1, the engine body 1 has four cylinders 2: a first cylinder 2a, a second cylinder 2b, a third cylinder 2c, and a fourth cylinder 2d in order from one side.

This engine is a four-stroke engine in which an intake stroke, a compression stroke, an expansion stroke, and an exhaust stroke are performed in each cylinder 2. For a four-cylinder engine as the one described in this embodiment, spark ignitions are performed at intervals of 180 degrees of crankshaft rotation in the order of the first cylinder 2a, the third cylinder 2c, the fourth cylinder 2d, and the second cylinder 2b, and thereby stokes such as the exhaust strokes occur in this order.

In addition, this engine has a high compression ratio, i.e., a geometric compression ratio of higher than 12. The geometric compression ratio is defined from the ratio of the combustion chamber volume with the piston at the bottom dead center to the combustion chamber volume with the piston at the top dead center.

The engine body 1 comprises, as shown in FIG. 2, a cylinder head 3 and a cylinder block 4 in which each cylinder 2 is provided. The cylinder 2 houses a piston 5, and a combustion chamber 6 is defined above the piston 5.

An intake port 7 and an exhaust port 8 that are communicated with the combustion chamber 6 are provided above each cylinder 2. The intake port 7 is a route for introducing air into each cylinder 2. The exhaust port 8 allows the exhaust gases to go out of each cylinder 2. The opening and closing of the intake port 7 is controlled by an intake valve 9. The opening and closing of the exhaust port 8 is controlled by an exhaust valve 10. Furthermore, a fuel injection valve 11 for injecting the fuel into the combustion chamber 6 and a spark plug 12 that ignites the air-fuel mixture within the combustion chamber 6 are disposed for each cylinder 2. While the fuel injection valve 11 shown in FIG. 2 directly injects the fuel into the combustion chamber 6, it may injects the fuel into the intake port 7.

The intake valve 9 is driven by an intake valve drive mechanism 13. The exhaust valve 10 is driven by an exhaust valve drive mechanism 16.

The intake valve drive mechanism 13 has an intake camshaft 14 and a variable intake valve timing mechanism 15. The intake valve 9 opens and closes by the rotation of the intake camshaft 14 with an intake cam mounted on the intake camshaft 14. The variable intake valve timing mechanism 15 allows the timing of opening and closing the intake valve 9 to be changed. This variable intake valve timing mechanism 15 can adjust an effective compression ratio by means of altering the timing of closing the intake valve 9, and constitutes an effective compression ratio adjuster. It is noted that the effective compression ratio is defined from the ratio of the combustion chamber volume with the intake valve being closed to the combustion chamber volume with the piston at the top dead center.

Further, the exhaust valve drive mechanism 16 has an exhaust camshaft 17 and a variable exhaust valve timing mechanism 18. The exhaust valve 10 opens and closes by the rotation of the exhaust camshaft 17 with an exhaust cam mounted on the exhaust camshaft 17. The variable exhaust valve timing mechanism 18 allows the timing of opening and closing the exhaust valve 10 to be changed.

Each of the variable intake valve timing mechanism 15 and the variable exhaust valve timing mechanism 18 in this embodiment is made up of a phasing variable valve timing mechanism. The phasing variable valve timing mechanism does not vary the duration of valve opening and varies the timing of opening and closing it. Various structures of the variable valve timing mechanism are conventionally known, and thus they are not specifically illustrated and described. As an example, a member for shifting the phase angle is provided between the cam pulley and the camshaft to which the rotation of the crankshaft is transferred through timing belts, to allow their rotation relative to each other. This member is driven electrically or hydraulically.

The variable intake valve timing mechanism 15 and the variable exhaust valve timing mechanism 18 are controlled by a microcomputer-based controller 20 for engine control. This controller 20 also controls the time that the spark plug 12 sparks, through an ignition circuit 21. The controller 20 and the ignition circuit 21 constitute an ignition timing controller. The controller 20 is supplied with a signal from a rotation speed sensor 22 which detects a rotation speed of the engine. It is also supplied with a signal from a sensor, such as a throttle sensor which is not shown, which detects a load of the engine.

The exhaust manifold 30 is connected to one side of the engine body 1.

The exhaust manifold 30 comprises four branched exhaust passages 31 connected to the respective exhaust ports 8 of the individual cylinders 2, two first collector segments 32 each of which joins the branched exhaust passages 31 for the cylinders which are not adjacent in the exhaust order sequence, two middle exhaust passages 33 connected to the downstream of the first collector segments 32, respectively, and a single second collector segment 34 that joins the middle exhaust passages 33. As described above, in the four-cylinder engine where the exhaust strokes occur in the order of the first cylinder 2a, the third cylinder 2c, the fourth cylinder 2d, and the second cylinder 2b, the branched exhaust passages 31 that communicate with the exhaust ports 8 of the first cylinder 2a and the fourth cylinder 2d are joined to each other, and the branched exhaust passages 31 that communicate with the exhaust ports 8 of the second cylinder 2b and the third cylinder 2c are joined to each other, among the four branched exhaust passages 31 connected to the exhaust ports 8 of the individual cylinders 2, to form the two first collector segments 32 and the two middle exhaust passages 33 downstream therefrom. The two middle exhaust passages 33 are joined to each other at the downstream side thereof into the second collector segment 34. The downstream portion of the second collector segment 34 serves as a single exhaust passage 35.

The cross-sectional areas of these passages are defined in such a manner that a cross-sectional area S1 of the one branched exhaust passage 31, a cross-sectional area S2 of one middle exhaust passage 33, and a cross-sectional area S3 of the exhaust passage 35 located downstream of the second collector segment 34 satisfy the relation given by (S2/S1)<(S3/S2). In other words, the radial extension of the cross-sectional area S2 of the middle exhaust passage 33 from the cross-sectional area S1 of the branched exhaust passage 31 is relatively small, and the radial extension of the cross-sectional area S3 of the exhaust passage 35 located downstream of the second collector segment 34 from the cross-sectional area S2 of the middle exhaust passage 33 is much larger in extent.

Figure 3:
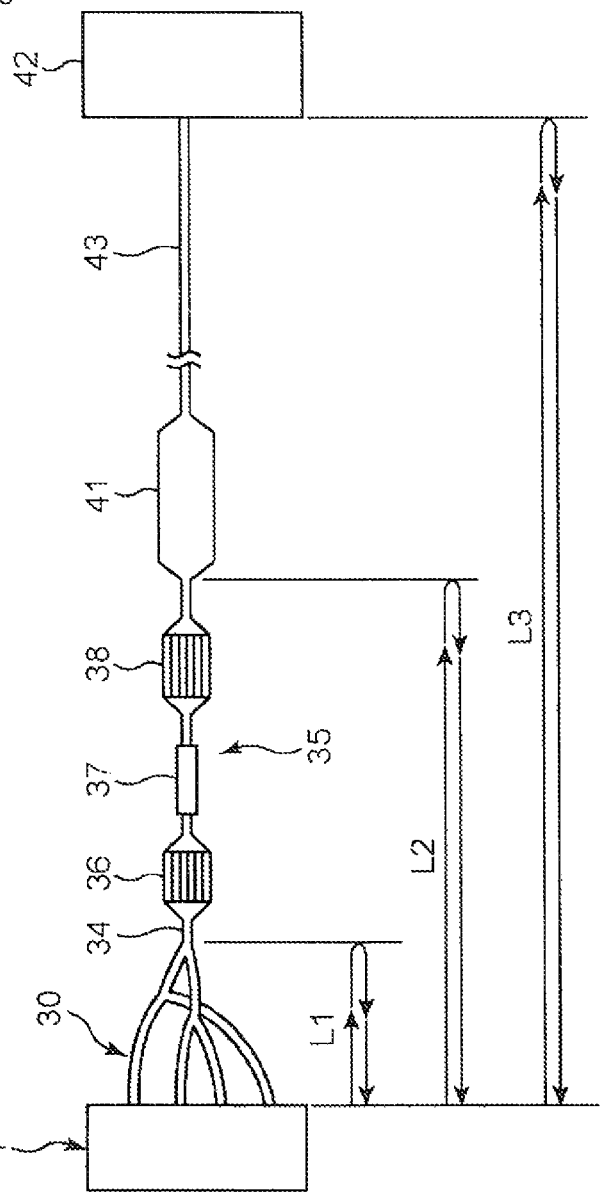
FIG. 3 is a schematic plan view of an exhaust system of the engine.

FIG. 3 schematically shows an exhaust system comprising the exhaust manifold 30 and components provided downstream of it. As shown in this figure, the exhaust passage 35 located downstream of the second collector segment 34 of the exhaust manifold 30 is connected to a close-coupled catalyst 36 which in turn is connected, at the downstream thereof, to a catalyst 38 via a flexible joint 37. The close-coupled catalyst 36 and the catalyst 38 are for the purification of exhaust gas, and have a hollow cylindrical casing and a catalyst disposed within the passage running through the casing.

In addition, provided downstream of the exhaust manifold 30 are diameter-expanded cavities each having a space therein with a larger cross section of the exhaust passage. In this embodiment, a pre silencer 41 constitutes an upstream diameter-expanded cavity and a main silencer 42 constitutes a downstream diameter-expanded cavity. The pre silencer 41 is connected to the downstream of the catalyst 38. The main silencer 42 is connected to the downstream of the pre silencer 41 through an exhaust pipe 43 having a predetermined length. As will be described later, the relation between a passage length L1 extending from each cylinder 2 to the second collector segment 34 of the exhaust manifold 30 and a passage length L2 from each cylinder 2 to the pre silencer 41 is defined to be given by $3*L1<L2<4*L1$. The relation between the passage length L1 and a passage length L3 from each cylinder 2 to the main silencer 42 is defined to be given by $5*L1<L3<7*L1$.

Figure 4:
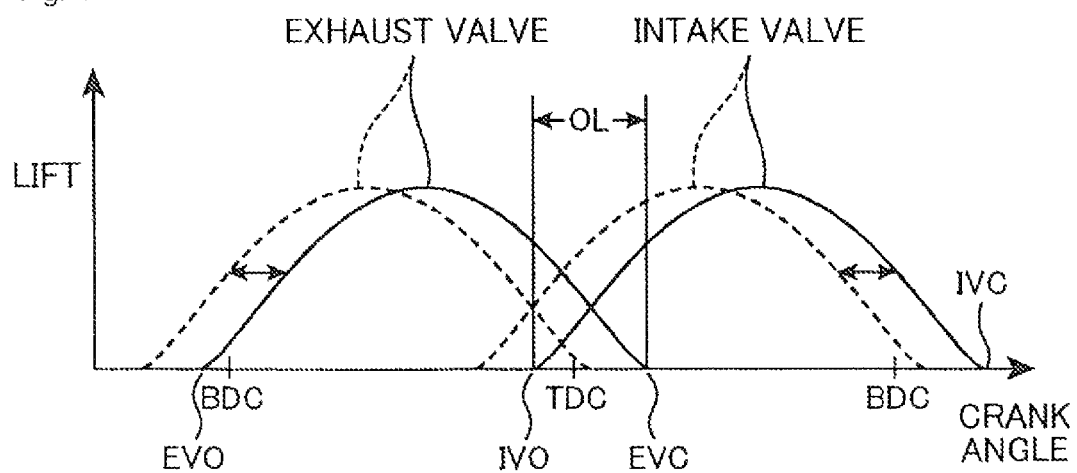
FIG. 4 is a diagram showing opening/closing timing of an exhaust valve and an intake valve as well as overlap periods.

FIG. 4 shows opening/closing timing of the exhaust valve 10 and the intake valve 9. In this figure, EVO represents a valve opening time of the exhaust valve 10, EVC represents a valve closing time of the exhaust valve 10, IVO represents a valve opening time of the intake valve 9, and IVC represents a valve closing time of the intake valve 9. In addition, OL represents a valve overlap period of the intake valve 9 and the exhaust valve 10. As illustrated in this figure, each of the opening/closing timing of the exhaust valve 10 and the opening/closing timing of the intake valve 9 can be modified between the timing indicated by the solid lines and the timing indicated by the broken lines.

In this embodiment, the controller 20 controls the variable intake valve timing mechanism 15 and the variable exhaust valve timing mechanism 18 according to operating conditions such as engine speed and engine load, which in turn controls the opening/closing timing of the exhaust valve 10 and the opening/closing timing of the intake valve 9.

In particular, in low and middle speed ranges in a high load region (in a low/middle speed and high load conditions) of the engine, the valve closing time IVC of the intake valve 9 is controlled in such a manner that the effective compression ratio becomes higher than 10. Furthermore, in such low/middle speed and high load conditions of the engine, the valve overlap period OL of a predetermined duration is maintained, and the valve opening time EVO of the exhaust valve 10 is changed according to the engine speed in order for negative pressure waves from exhaust pressure pulses to reach the exhaust port 8 of a given cylinder 2 during the valve overlap period OL of that cylinder 2 at different engine speed ranges.

Figure 5:
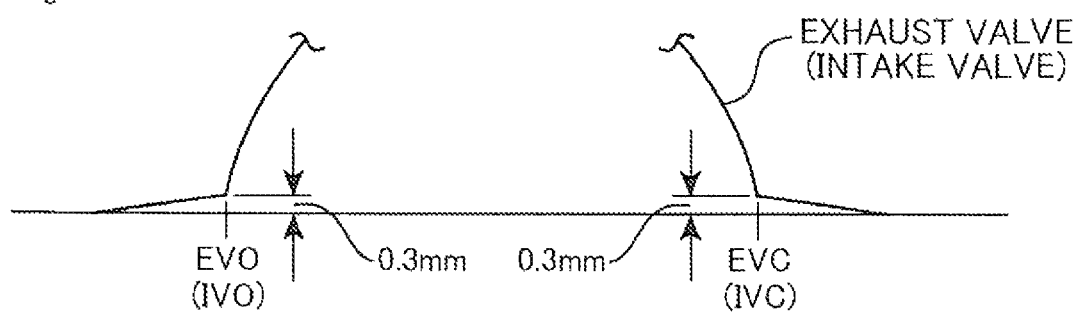
FIG. 5 is a view illustrating definitions of a valve opening time and a valve closing time of the exhaust valve and the intake valve.

The valve opening times IVO and EVO as well as the valve closing times IVC and EVC of the intake valve 9 and the exhaust valve 10 are defined with a valve lift of 0.3 mm. The valve lift of 0.3 mm corresponds to the height of a ramp (an interval during which the profile of the valve lift has a gradual slope near the valve opening/closing points) in a valve lift profile as shown in FIG. 5. Accordingly, the period during which the intake valve 9 and the exhaust valve 10 are kept opened and the valve overlap period OL are within a duration except for the ramp.

In low and middle speed ranges in a low load region (in a low/middle speed and low load conditions) of the engine, the controller 20 controls the valve closing time IVC of the intake valve 9 to decrease the effective compression ratio relative to that in the low/middle speed and high load conditions. In other words, control is performed to decrease the effective compression ratio by means of retarding the valve closing time IVC of the intake valve 9 from the intake bottom dead center much more for low load conditions than high load conditions even though IVC comes after the intake bottom dead center.

As described above, the controller 20 controls the times that the intake valve 9 and the exhaust valve 10 open and close, and also controls the time that the spark plug 12 sparks. In the low/middle speed and high load conditions of the engine, the ignition timing is retarded a predetermined amount from the MBT (ignition timing for the best torque). The predetermined amount as used herein corresponds to the amount of degree(s) to be retarded at which knocking can be reduced.

Operations of the engines according to this embodiment are described.

In the engine according to this embodiment, the exhaust manifold 30 has such an advantageous configuration that prevents exhaust interference between the cylinders from adversely affecting the effectiveness of the scavenging action, and that increases the effectiveness of the scavenging action as a result that a negative pressure from the pressure pulses reaches the exhaust port 8 during the valve overlap period OL. These effects are described with reference to FIGS. 6 to 8.

Figure 6:
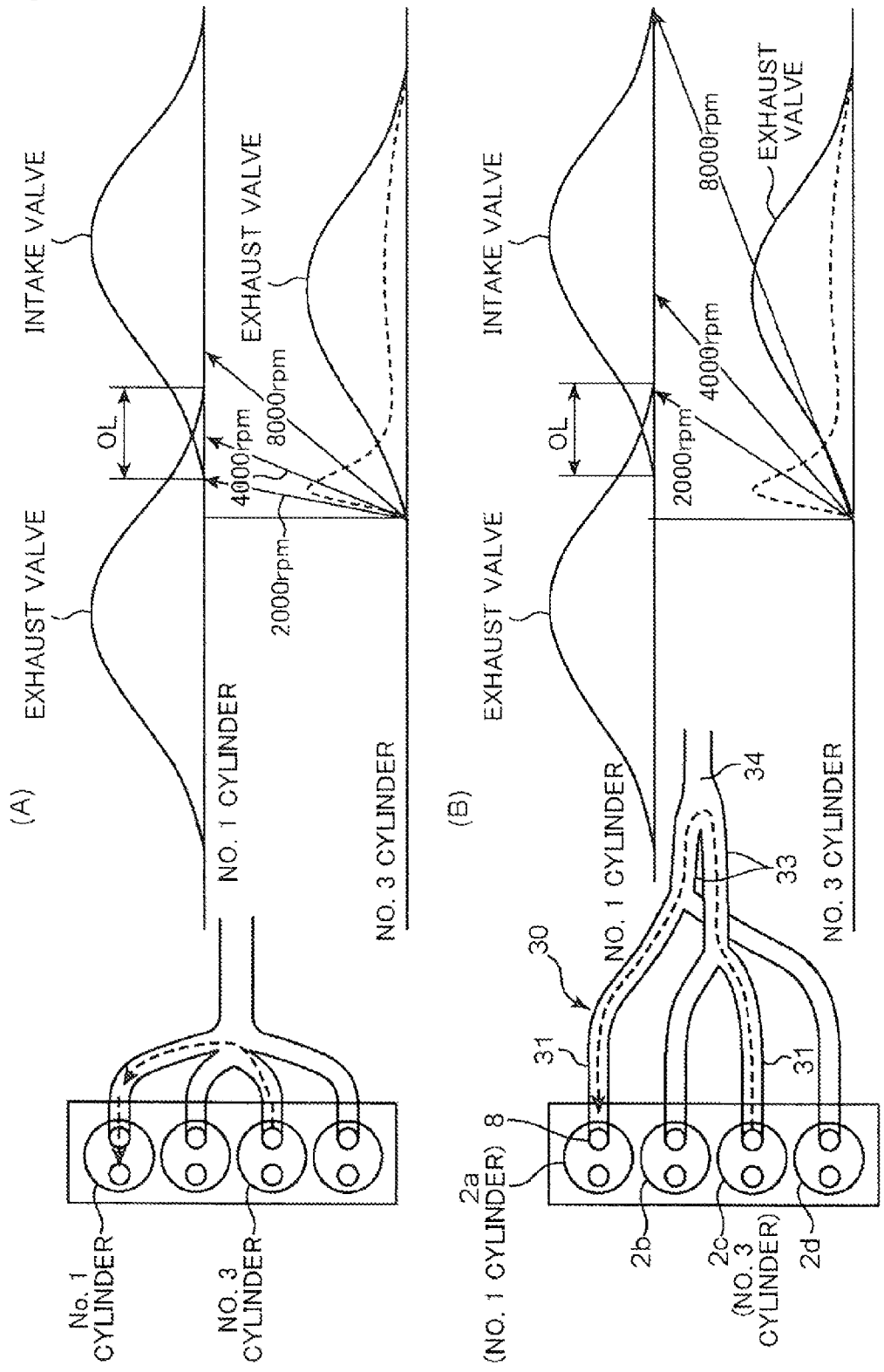
FIG. 6 is a view for use in describing exhaust interference between cylinders, in which (A) represents a case of a conventional exhaust manifold, while (B) represents a case of an engine exhaust manifold according to an embodiment of the present invention.

FIG. 6 is a view for use in describing exhaust interference between the cylinders, in which FIG. 6 (A) represents a case of a conventional exhaust manifold having short branched exhaust passages are joined together into a single collector segment (of which structure is diagrammatically shown on the left side) while FIG. 6 (B) represents a case of the exhaust manifold according to this embodiment (of which structure is diagrammatically shown on the left side). These figures include the indication of the times that the exhaust valve and the intake valve of the first cylinder open and close, the indication of the time that the exhaust valve of the third cylinder opens and closes. In addition, a broken line represents a pressure produced at the exhaust port of the third cylinder as a result of opening the exhaust valve of that cylinder.

As shown in these figures, a high positive pressure is produced at the exhaust port due to a rapid escape of the exhaust gases (so-called blowdown) immediately after the exhaust valve of the third cylinder opens. The first cylinder has a valve overlap period OL that starts slightly after the time that the exhaust valve of the third cylinder opens. The positive pressure wave produced in the third cylinder is propagated to other cylinders. The conventional exhaust manifold as shown in FIG. 6 (A) has a short pressure wave propagation path from the third cylinder to the first cylinder. Thus, the positive pressure wave reaches the exhaust port of the first cylinder during the valve overlap period OL of that cylinder, which interferes the scavenging action, particularly in low/middle speed ranges of approximately 2,000 rpm or 4,000 rpm.

On the other hand, in the exhaust manifold 30 according to this embodiment as shown in FIG. 6 (B), the positive pressure wave produced in the third cylinder 2c propagates to the first cylinder 2a through the branched exhaust passage 31 and the middle exhaust passage 33 extending from the third cylinder 2c to the second collector segment 34, and the middle exhaust passage 33 and the branched exhaust passage 31 extending from the second collector segment 34 to the first cylinder 2a. As apparent from the above, there is a longer pressure wave propagation path, which delays the timing for the positive pressure wave produced in the third cylinder 2c to reach the exhaust port 8 of the first cylinder 2a. The positive pressure wave does not reach the exhaust port 8 of the cylinder 2a during the valve overlap period OL of the first cylinder 2a even in low/middle speed ranges of approximately 2,000 rpm or 4,000 rpm. This prevents the deterioration of the effectiveness of the scavenging action due to the exhaust interference.

Figure 7:
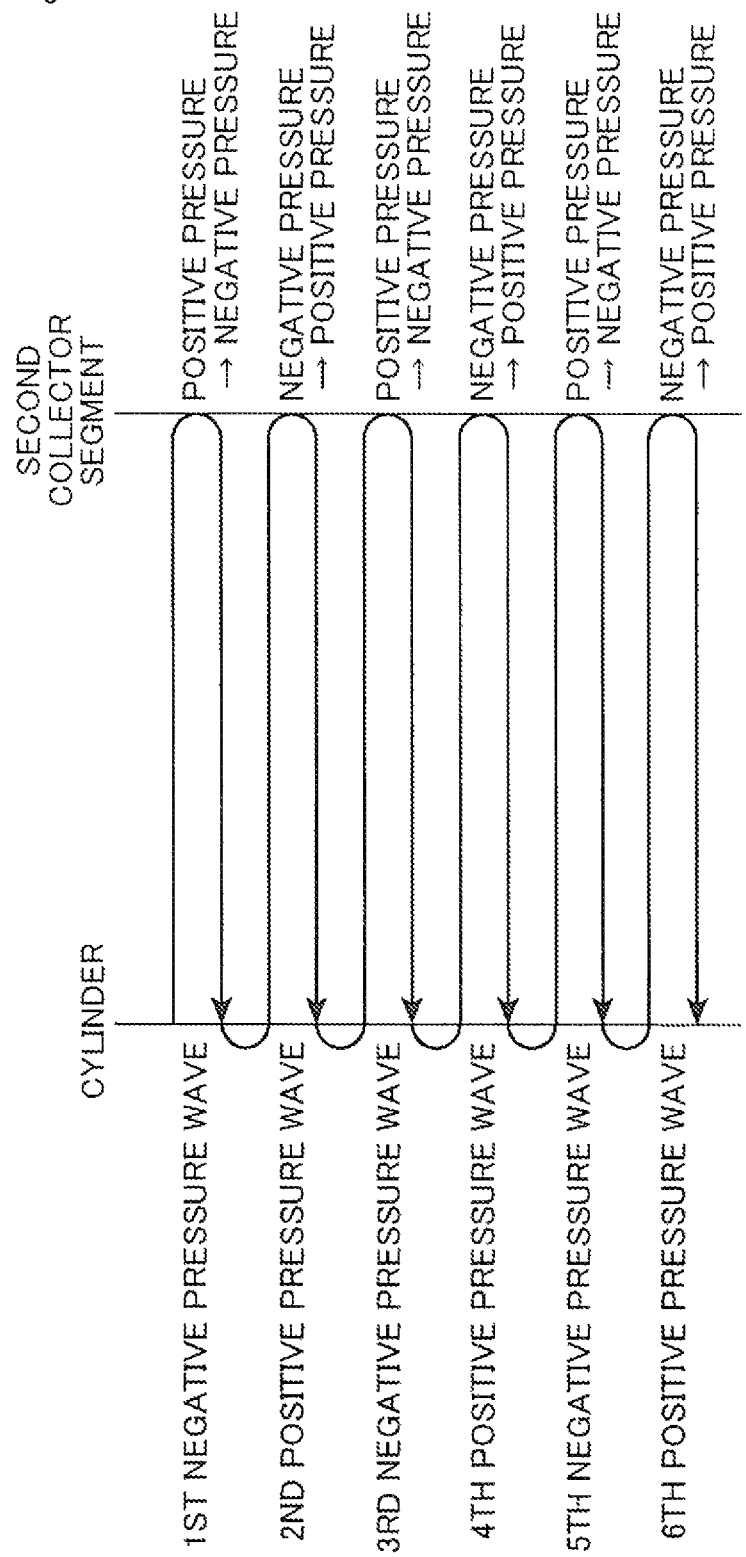
FIG. 7 is a view for use in describing how a pressure wave travels back and forth between the cylinder and the second collector segment of the exhaust manifold.
Figure 8:
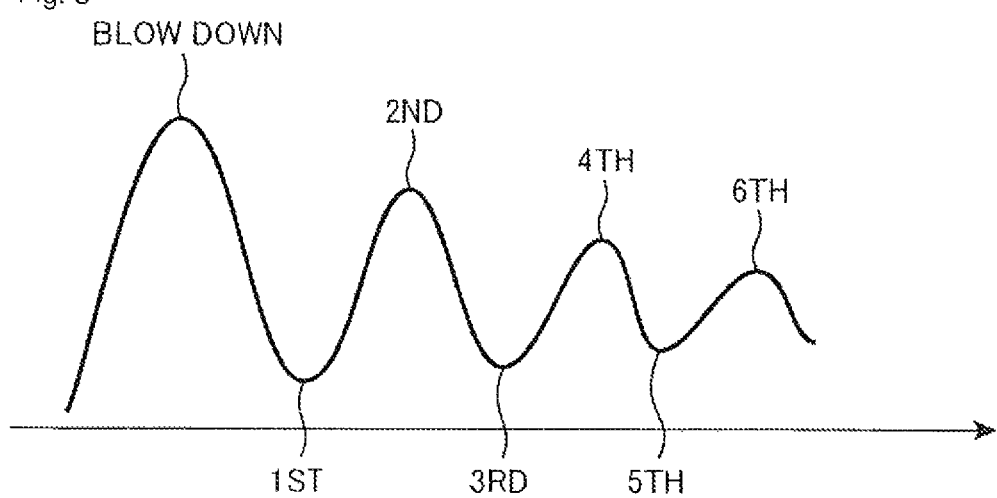
FIG. 8 is a graph illustrating a pressure change produced at an exhaust port of the cylinder.

Next, the pressure waves acting on the exhaust port 8 from the exhaust pressure pulses are described with reference to FIGS. 7 and 8.

A large positive pressure wave is produced by the blowdown in each cylinder 2 immediately after the exhaust valve 10 opens, causing exhaust pressure pulses in the exhaust manifold 30. In this case, in the exhaust manifold 30 as shown in FIG. 1, the aforementioned relation (S2/S1)<(S3/S2) is satisfied. Thus, most components of the pressure wave are not inverted and pass through the first collector segment 32 that joins the branched exhaust passages 31 for the cylinders which are not adjacent in the exhaust order sequence. The pressure wave is inverted in the second collector segment 34 and reflected therefrom. As a result, as shown in FIG. 7, the pressure wave travels back and forth between the cylinder 2 and the second collector segment 34 and the pressure is inverted between the positive pressure and the negative pressure in the second collector segment 34. The exhaust port 8 thus alternately receives the negative pressure wave and the positive pressure wave. Accordingly, the pressure waves that reach the exhaust port 8 are: negative pressure waves in the first (1st round), third (3rd round), and fifth (5th round) propagation events, and positive pressure waves in the second (2nd round), fourth (4th round), and sixth (6th round) propagation events. The pressure acting on the exhaust port 8 fluctuates as shown in FIG. 8, and is gradually attenuated as the pressure wave travels back and forth while being inverted between negative and positive.

The negative pressure wave from such exhaust pressure pulses that reaches the exhaust port 8 during the valve overlap period OL allows for good exhaust gas sucking from the cylinder 2 to improve the effectiveness of the scavenging action.

It should be noted that fluctuation of the engine speed results in change in time duration between the occurrence of the positive pressure wave immediately after the exhaust valve opens and the valve overlap period, which changes the time that the negative pressure wave reaches the exhaust port 8 relative to the valve overlap period OL. If the passage length L1 from the cylinder 2 to the second collector segment 34 is defined so that, for example, a 1st negative pressure wave reaches the exhaust port 8 during the valve overlap period OL in a rotation speed range of around 5,000 rpm, a 3rd negative pressure wave reaches the exhaust port 8 during the valve overlap period OL in a rotation speed range of around 2,500 to 3,000 rpm, and a 5th negative pressure wave reaches the exhaust port 8 during the valve overlap period OL in a rotation speed range of around 1,500 to 2,000 rpm. This can improve the effectiveness of the scavenging action by the negative pressure waves even in the low/middle engine speed ranges. The exhaust manifold 30 according to this embodiment allows for such settings.

On the contrary, the conventional exhaust manifold that is diagrammatically shown in FIG. 6 (A) has a short path between the cylinder and the collector segment through which the pressure wave travels back and forth in a short period of time. The pressure wave travels back and forth more frequently in the low/middle engine speed ranges within the duration from the time that the positive pressure wave occurs immediately after the exhaust valve opens to the valve overlap period. This results in significant attenuation of the pressure wave, hardly improving the effectiveness of the scavenging action by the negative pressure waves.

Figure 9:
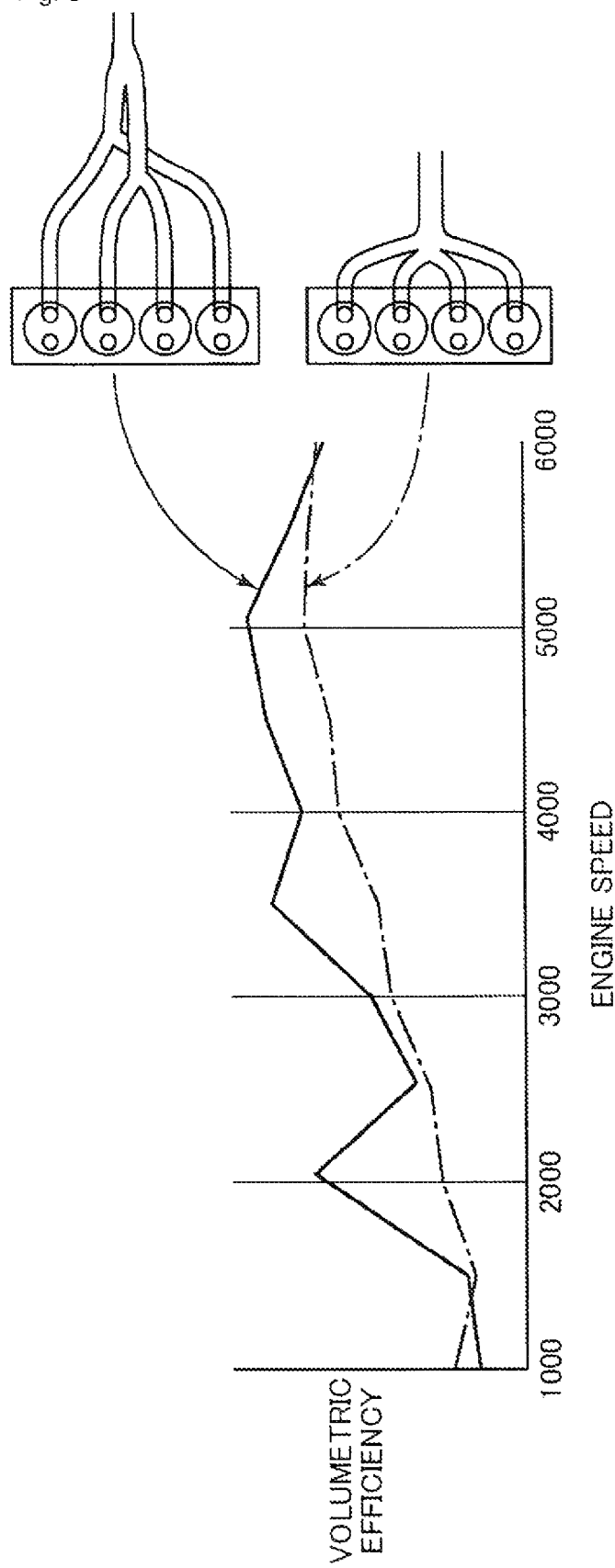
FIG. 9 is a data indicating the variation of intake volumetric efficiency as a function of various ranges of engine speed for a case of a conventional exhaust manifold and a case of the engine exhaust manifold according to an embodiment of the present invention.

FIG. 9 shows data indicating the variation of intake volumetric efficiency as a function of various ranges of engine speed with the opening/closing timing of the intake and exhaust valves is set to achieve a certain large valve overlap period, for a case of a conventional exhaust manifold having short branched exhaust passages are joined together into a single collector segment (of which structure is diagrammatically shown on the lower right side) and a case of the exhaust manifold according to this embodiment (of which structure is diagrammatically shown on the upper right side).

As shown in this figure, in the aforementioned conventional exhaust manifold, the exhaust interference adversely affects the effectiveness of the scavenging action over the low to high speed ranges, as described above. In addition, the negative pressure wave hardly serves to improve the effectiveness of the scavenging action as described above. It will therefore have less volumetric efficiency.

On the other hand, the exhaust manifold 30 according to this embodiment can avoid deterioration of the effectiveness of the scavenging action by the exhaust interference over the low to high speed ranges, which results in a higher value of volumetric efficiency. Furthermore, in certain rotation speed ranges such as around 2,000 rpm, around 3,500 rpm, and around 5,000 rpm, the negative pressure wave acts on the exhaust port 8 during the valve overlap period OL, improving the effectiveness of the scavenging action.

When the time that the exhaust valve 10 opens and the valve overlap period OL are both fixed, the negative pressure wave reaches the exhaust port 8 during the valve overlap period OL only within a certain rotation speed range. In the rotation speed range(s) other than the above, the time that the negative pressure wave reaches the exhaust port 8 does not fall within the valve overlap period OL. On the other hand, in this embodiment, the time that the exhaust valve 10 opens can be changed according to the engine speed, the negative pressure wave reaches the exhaust port 8 during the valve overlap period OL in many rotation speed ranges.

Figure 10:
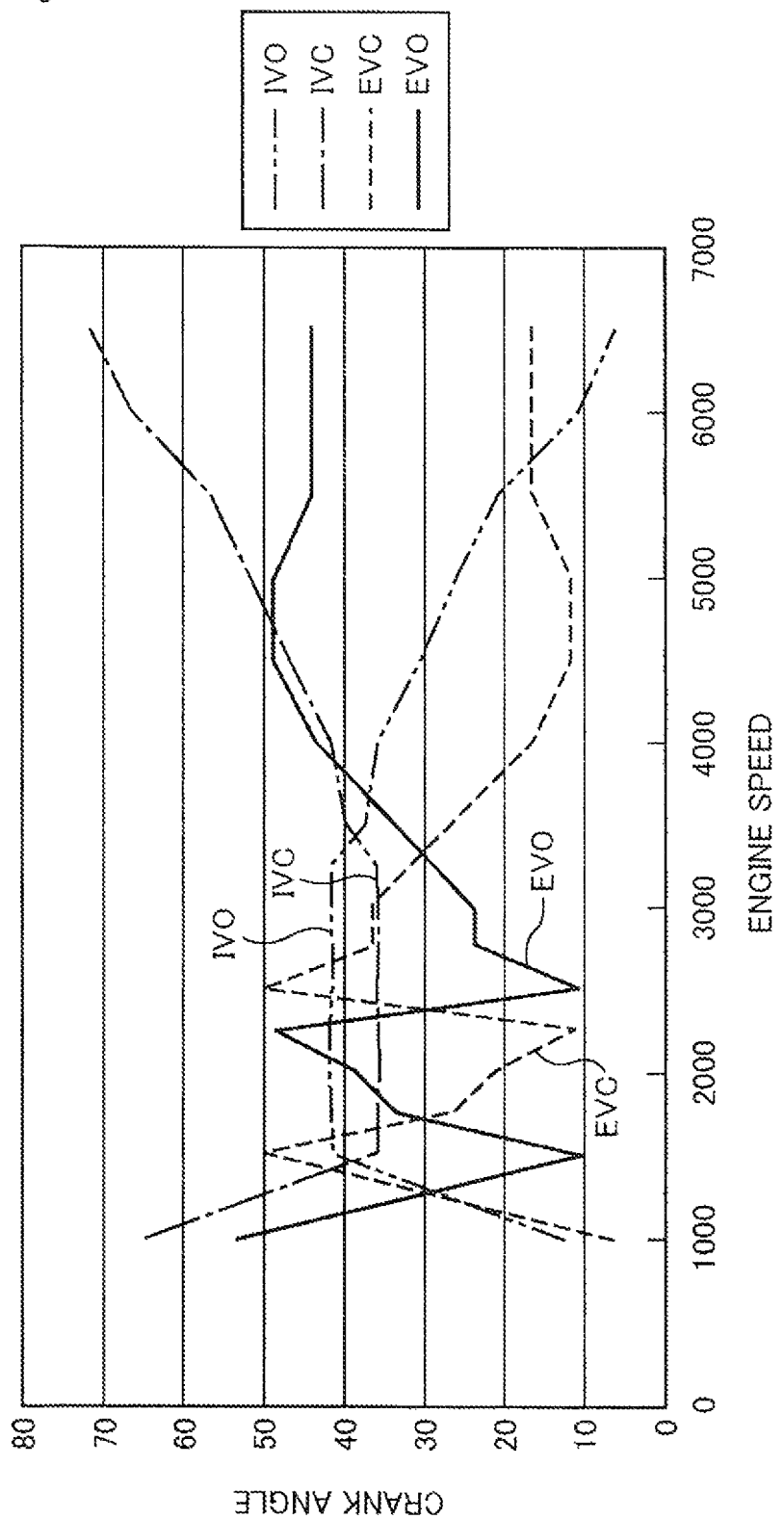
FIG. 10 is a characteristic curve showing to change the times that the exhaust and intake valves open and close according to the engine speed.

As shown in FIG. 10 and Table 1, the times that the exhaust valve 10 opens and closes and the times that the intake valve 9 opens and closes are changed according to the engine speed.

TABLE 1

| rpm | EVO | EVC | IVO | IVC |
|---|---|---|---|---|
| 1500 | 11 | 50 | 42 | 36 |
| 2000 | 39 | 22 | 42 | 36 |
| 2500 | 11 | 50 | 42 | 36 |
| 3000 | 24 | 37 | 42 | 36 |
| 3500 | 34 | 37 | 38 | 40 |
| 5000 | 49 | 12 | 26 | 52 |

The vertical axis of the graph shown in FIG. 10 and the values indicated in the second to fifth columns from the left in Table 1 correspond to: a crank angle before the bottom dead center (BBDC) for the valve opening time EVO of the exhaust valve 10; a crank angle after the top dead center (ATDC) for the valve closing time EVC of the exhaust valve 10; a crank angle before the top dead center (BTDC) for the valve opening time IVO of the intake valve 9; and a crank angle after the bottom dead center (ABDC) for the valve closing time IVC of the intake valve 9.

Description is made in accordance with FIG. 10 and Table 1. The valve opening time EVO of the exhaust valve 10 is most retarded to 11 degrees BBDC at the engine speed of 1,500 rpm, under which the fifth (5th round) negative pressure wave reaches the exhaust port 8 during the valve overlap period OL as shown in below-described FIG. 13. Then, the valve opening time EVO of the exhaust valve 10 is gradually advanced in a range between 1,500 rpm and just over 2,000 rpm as the engine speed increases. The blowdown that initiates production of the exhaust pressure pulses occurs at an earlier time and the fifth (5th round) negative pressure wave is kept reaching the exhaust port 8 within the valve overlap period OL. When the engine speed reaches 2,500 rpm, the valve opening time EVO of the exhaust valve 10 is again retarded to 11 degrees BBDC. Then, the third (3rd round) negative pressure wave reaches the exhaust port 8 during the valve overlap period OL as shown in below-described FIG. 15. The valve opening time EVO of the exhaust valve 10 is gradually advanced at a higher engine speed than 2,500 rpm as the engine speed increases. The third (3rd round) negative pressure wave is kept reaching the exhaust port 8 during the valve overlap period OL in a range between 2,500 rpm and around 4,000 rpm.

As apparent from the above, the valve opening time EVO of the exhaust valve 10 is changed according to the engine speed in the low/middle engine speed ranges. The negative pressure waves from the exhaust pressure pulses are controlled to reach the exhaust port during the valve overlap period OL in two or more engine speed ranges.

When the engine speed reaches a high speed range of around 4,000 rpm or higher, the valve opening time EVO of the exhaust valve 10 is kept at a more advanced point than the valve opening time EVO at 4,000 rpm in order to exhaust a large quantity of exhaust gases. Even when the valve opening time EVO of the exhaust valve 10 is kept at a more advanced point, the first (1st round) negative pressure wave reaches the exhaust port 8 during the valve overlap period OL as shown in below-described FIG. 17 at an engine speed of around 5,000 rpm.

The valve closing time IVC of the intake valve 9 is constant in an engine speed range between 1,500 rpm and 3,000 rpm and is set at 36 degrees ABDC. With the valve closing time IVC of the intake valve 9 being set at this amount, the effective compression ratio is not significantly reduced with respect to the geometric compression ratio and has a value larger than 10. When the engine speed is around 3,500 rpm or higher, the valve closing time IVC of the intake valve 9 is gradually retarded as the engine speed increases.

In this embodiment, each of the variable exhaust valve timing mechanism 18 and the variable intake valve timing mechanism 15 is a phasing variable valve timing mechanism, so that the valve closing time EVC of the exhaust valve 10 varies as a function of the valve opening time EVO, and the valve opening time IVO of the intake valve 9 varies as a function of the valve closing time IVC.

In this embodiment, the pre silencer 41 and the main silencer 42 shown in FIG. 3 contributes to improve the effectiveness of the scavenging action by the negative pressure waves from the exhaust pressure pulses within a predetermined rotation speed range.

More specifically, the pressure wave resulting from the blowdown that occurs immediately after the exhaust valve 10 opens is inverted in the second collector segment 34 and reflected therefrom as described above to produce the pressure pulses in the exhaust manifold 30. A portion of the pressure wave passes through the second collector segment 34 and propagates to the downstream of the exhaust manifold 30. Then, the pressure wave is inverted in the pre silencer 41, which serves as the upstream diameter-expanded cavity, and reflected therefrom. The portion of the pressure wave that reaches the pre silencer 41 passes through the pre silencer 41 and propagates to further downstream. It is inverted in the main silencer 42, which serves as the downstream diameter-expanded cavity, and reflected therefrom. In other words, as indicated by an arrow in FIG. 3, there are the pressure wave traveling back and forth between the cylinder 2 and the pre silencer 41, and the pressure wave traveling back and forth between the cylinder 2 and the main silencer 42, other than the pressure wave traveling back and forth between the cylinder 2 and the second collector segment 34 of the exhaust manifold 30.

Then, in a predetermined first engine speed range, the negative pressure wave inverted in the main silencer 42 reaches the exhaust port 8 during the valve overlap period OL. In a third engine speed range that is higher than the first engine speed range by a predetermined amount, the negative pressure wave inverted in the pre silencer 41 reaches the exhaust port 8 during the valve overlap period OL. In a second engine speed range between the first engine speed range and the third engine speed range, as well as a fourth engine speed range that is higher than the third engine speed range, the negative pressure wave from the pressure pulses in the exhaust manifold 30 reaches the exhaust port 8 during the valve overlap period OL.

More specifically, the passage length L2 from the cylinder 2 to the pre silencer 41 is set to meet 3*L1<L2<4*L1. This allows the time that the negative pressure wave inverted in the pre silencer 41 reaches the exhaust port 8 to become close to the time that the third through fourth pressure waves from the pressure pulses in the exhaust manifold 30 reach the exhaust port 8. Furthermore, the passage length L3 from the cylinder 2 to the main silencer 42 is set to meet 5*L1<L3<7*L1. This allows the time that the negative pressure wave inverted in the main silencer 42 reaches the exhaust port 8 to become close to the time that the fifth through sixth pressure waves from the pressure pulses in the exhaust manifold 30 reach the exhaust port 8.

Figure 11:
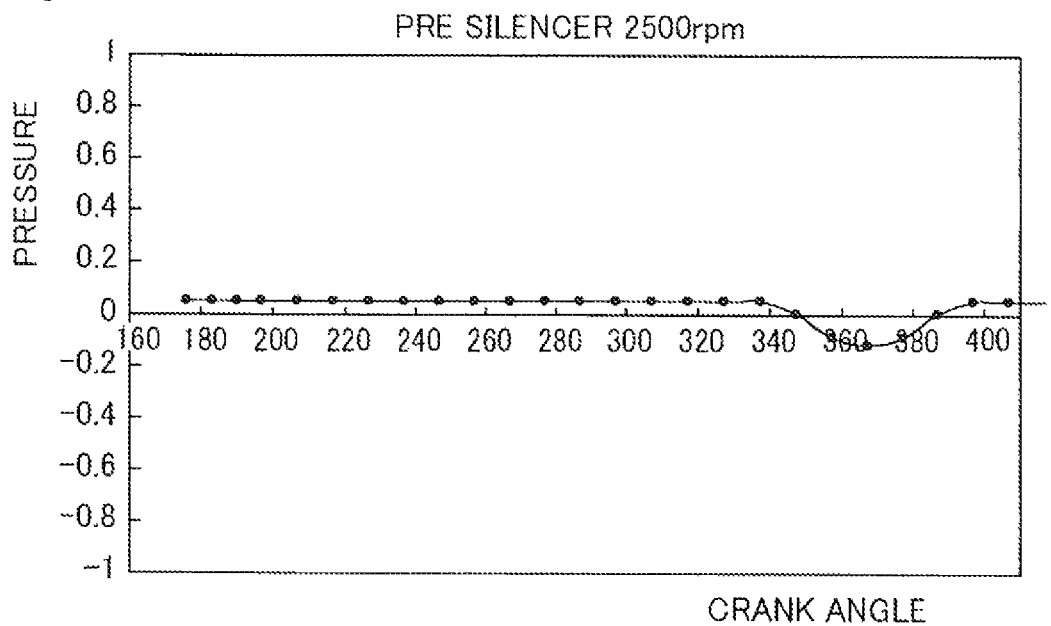
FIG. 11 is a view showing change in pressure in the exhaust port due to a pressure wave traveling back and forth between a cylinder and a pre silencer.
Figure 12:
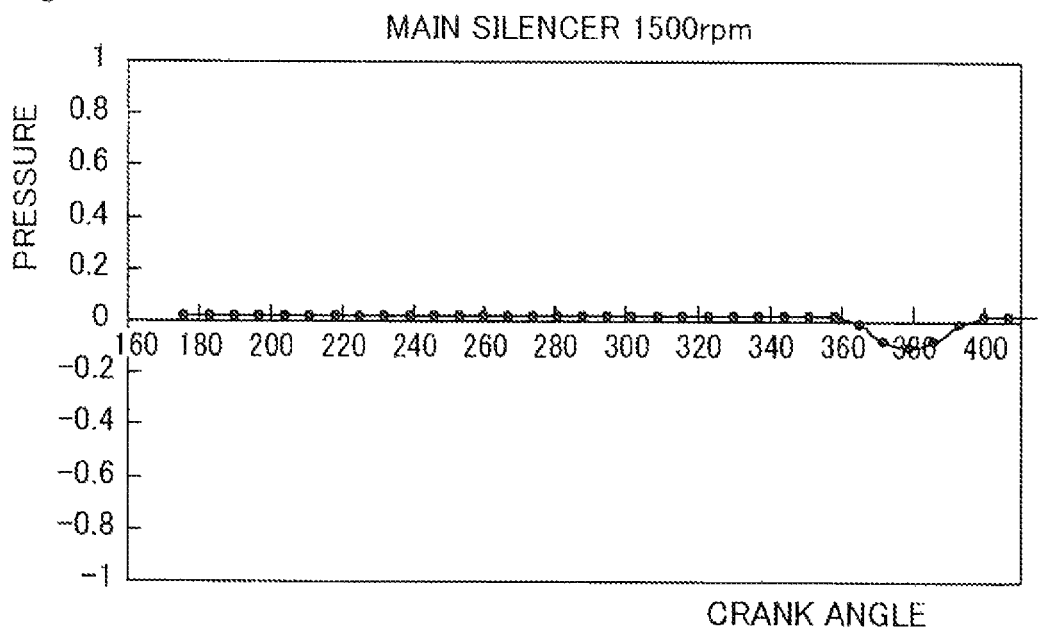
FIG. 12 is a view showing change in pressure in the exhaust port due to a pressure wave traveling back and forth between a cylinder and a main silencer.
Figure 13:
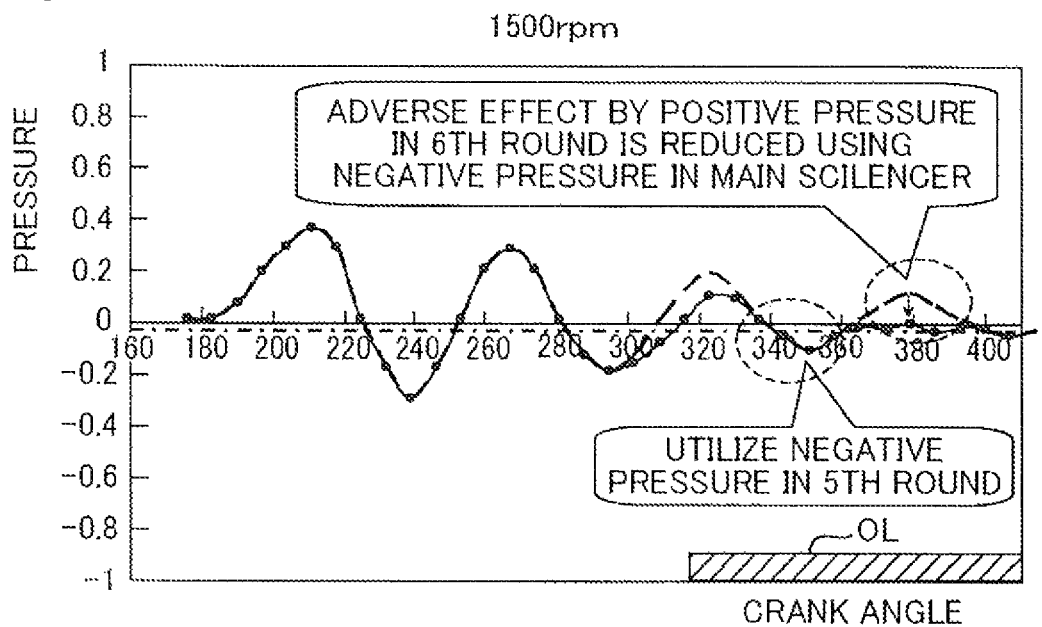
FIG. 13 is a view showing change in pressure in the exhaust port due to, for example, exhaust pressure pulses at an engine speed of 1,500 rpm.
Figure 15:
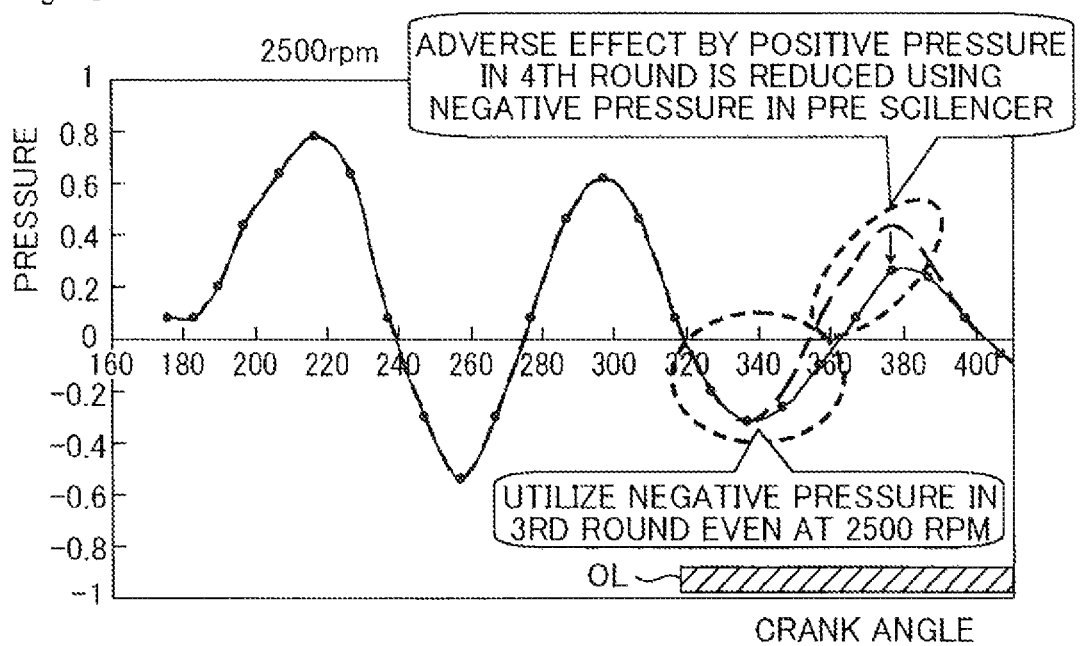
FIG. 15 is a view showing change in pressure in the exhaust port due to, for example, exhaust pressure pulses at an engine speed of 2,500 rpm.

By setting like this, the negative pressure wave inverted in the pre silencer 41 reaches the exhaust port 8 during the valve overlap period OL in an engine speed range around 2,500 rpm (third engine speed range) as shown in FIGS. 11 and 15, and the negative pressure wave inverted in the main silencer 42 reaches the exhaust port 8 during the valve overlap period OL in an engine speed range around 1,500 rpm (first engine speed range) as shown in FIGS. 12 and 13.

FIG. 11 shows a pressure applied to the exhaust port 8 by the pressure wave traveling back and forth between the cylinder 2 and the pre silencer 41 for a case where the engine speed is 2,500 rpm. FIG. 12 shows a pressure applied to the exhaust port 8 by the pressure wave traveling back and forth between the cylinder 2 and the main silencer 42 (see FIG. 3) for a case where the engine speed is 1,500 rpm. In these figures, the horizontal axis represents a crank angle from the compression top dead center while the vertical axis represents a pressure, which is based on the atmospheric pressure as a zero reference level.

FIGS. 13 to 17 each shows change in pressure in the exhaust port 8 after the exhaust valve 10 opens at various engine speeds. In these figures, the horizontal axis represents a crank angle from the compression top dead center while the vertical axis represents a pressure, which is based on the atmospheric pressure as a zero reference level. In addition, the valve overlap period OL is indicated at the lower right of each figure. In FIGS. 13 to 16, as to a part of the waveform representing the change in pressure in the exhaust port 8 where a solid line and a broken line are both present, the broken line represents the change in pressure due to only the pressure pulses in the exhaust manifold 30, and the solid line represents the change in pressure, taking the effects of the negative pressure wave inverted in the main silencer 42 and the negative pressure wave inverted in the pre silencer 41 into consideration.

At 1,500 rpm, as shown in FIG. 13, the negative pressure in the 5th round reaches the exhaust port 8 during the valve overlap period OL. The positive pressure in the 6th round also reaches the exhaust port 8 during the valve overlap period OL, but the positive pressure is decreased as a result of the addition of the negative pressure wave inverted in the main silencer 42. An adverse effect by the positive pressure in the 6th round is reduced while the negative pressure in the 5th round is utilized to improve the effectiveness of the scavenging action.

Figure 14:
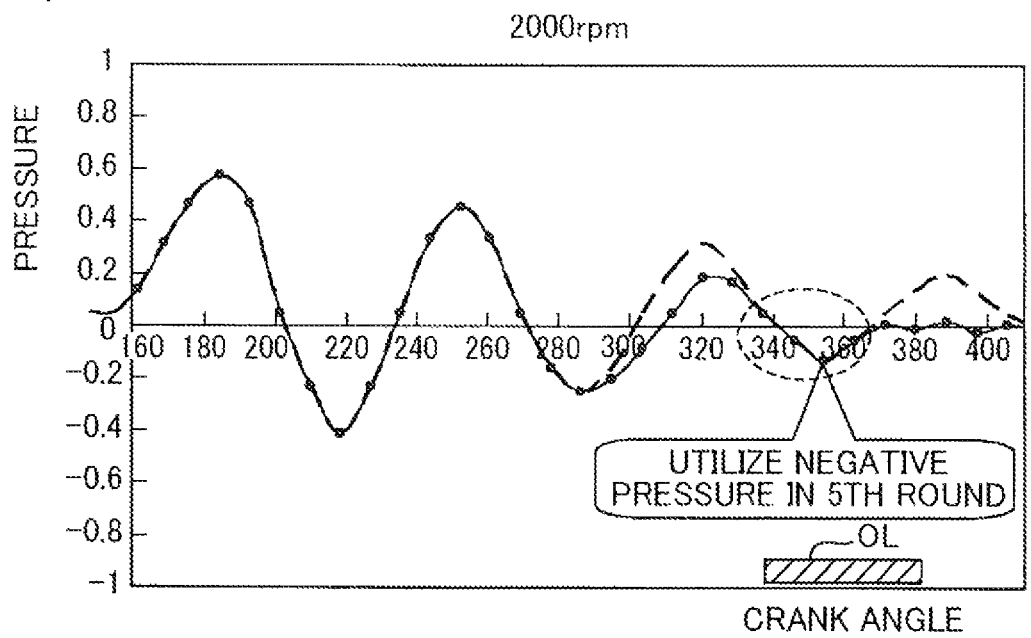
FIG. 14 is a view showing change in pressure in the exhaust port due to, for example, exhaust pressure pulses at an engine speed of 2,000 rpm.

At 2,000 rpm, as shown in FIG. 14, the negative pressure in the 5th round reaches the exhaust port 8 during the valve overlap period OL. This negative pressure is utilized to improve the effectiveness of the scavenging action.

At 2,500 rpm, as shown in FIG. 15, the negative pressure in the 3rd round reaches the exhaust port 8 during the valve overlap period OL. The positive pressure in the 4th round also reaches the exhaust port 8 during the valve overlap period OL, but the positive pressure is decreased as a result of the addition of the negative pressure wave inverted in the pre silencer 41. An adverse effect by the positive pressure in the 4th round is reduced while the negative pressure in the 3rd round is utilized to improve the effectiveness of the scavenging action.

Figure 16:
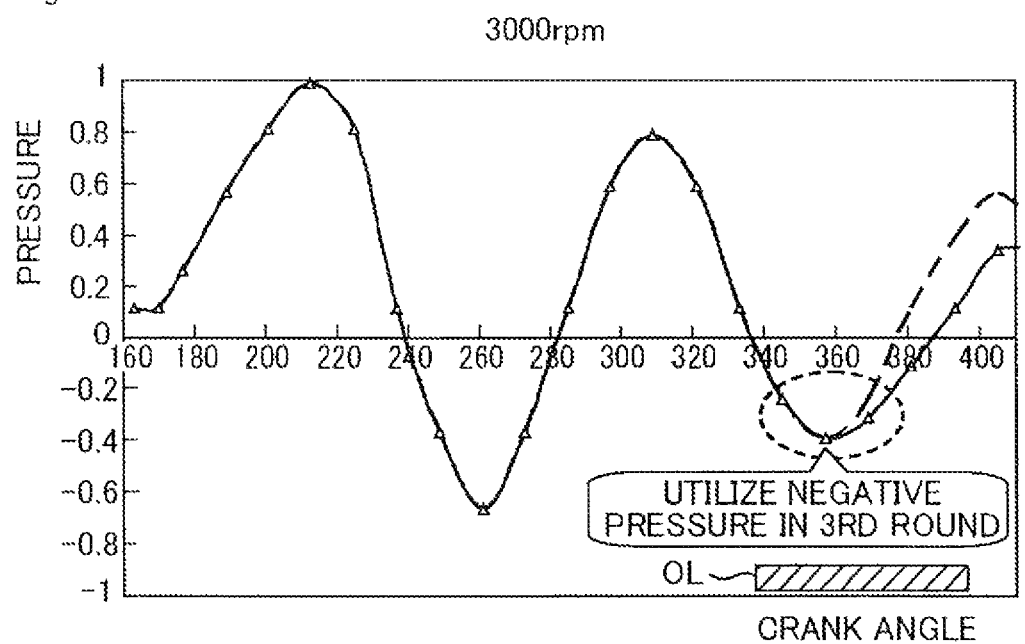
FIG. 16 is a view showing change in pressure in the exhaust port due to, for example, exhaust pressure pulses at an engine speed of 3,000 rpm.

At 3,000 rpm, as shown in FIG. 16, the negative pressure in the 3rd round reaches the exhaust port 8 during the valve overlap period OL and this negative pressure is utilized to improve the effectiveness of the scavenging action.

Figure 17:
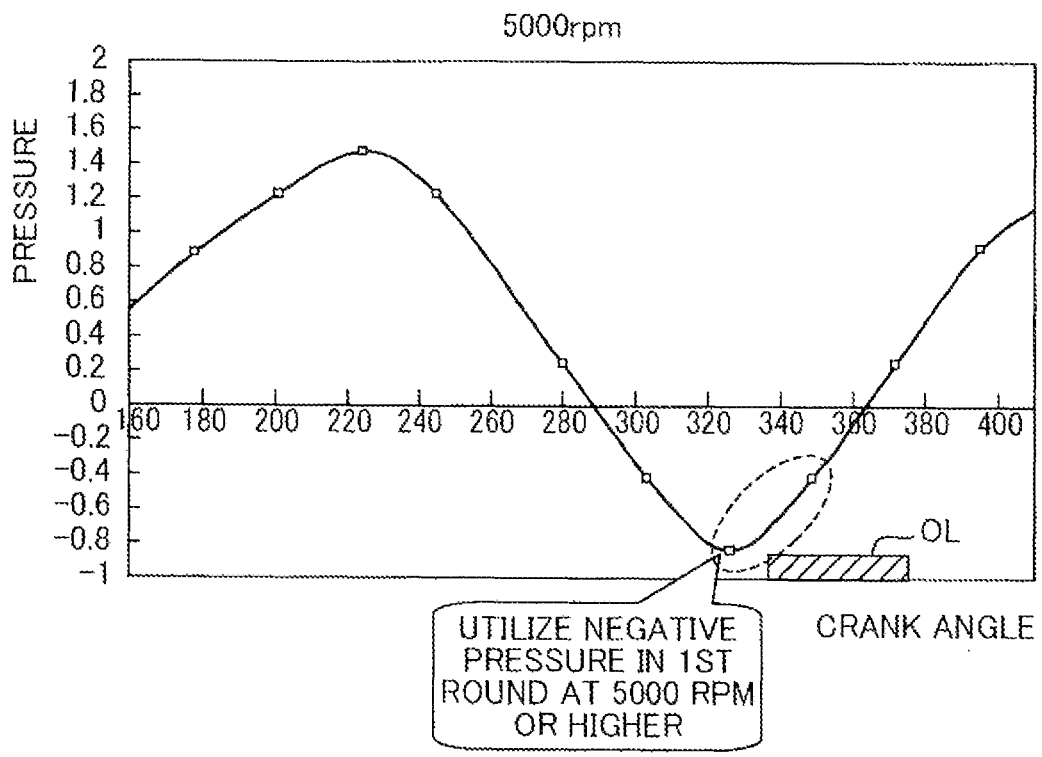
FIG. 17 is a view showing change in pressure in the exhaust port due to, for example, exhaust pressure pulses at an engine speed of 5,000 rpm.

At 5,000 rpm or a higher rotation speed, as shown in FIG. 17, the negative pressure in the 1st round reaches the exhaust port 8 during the valve overlap period OL. This negative pressure is utilized to improve the effectiveness of the scavenging action.

In this way, the negative pressure reaches the exhaust port 8 during the valve overlap period OL in various rotation speed ranges to improve the effectiveness of the scavenging action.

Figure 18:
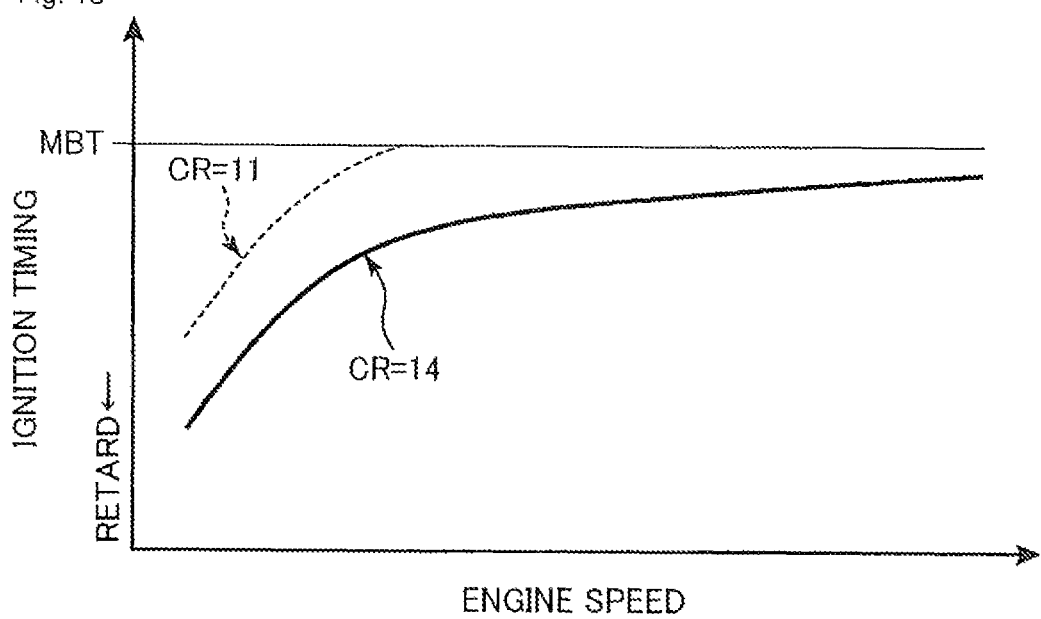
FIG. 18 is a characteristic curve showing the relation between an engine speed and an ignition timing for an engine having a geometric compression ratio CR of 14 corresponding to an example of the present invention and an engine having a geometric compression ratio CR of 11 corresponding to a comparative example.

FIG. 18 shows the relation between an engine speed and an ignition timing for a high compression ratio engine having a geometric compression ratio CR of 14 and an engine having a geometric compression ratio CR of 11.

As shown in this figure, in a low engine speed range, the ignition timing is retarded from the MBT to avoid knocking. The ignition timing becomes less retarded as the engine speed increases. The ignition timing is retarded by 0 (ignition timing coincides with MBT) around a range between low and middle speed ranges for the engine having the geometric compression ratio CR of 11. On the other hand, for high compression ratio engines that are more susceptible to engine knock, the ignition timing is retarded much more and is still retarded even in middle or high speed ranges although the degree of retarding becomes small as the engine speed increases.

Figure 19:
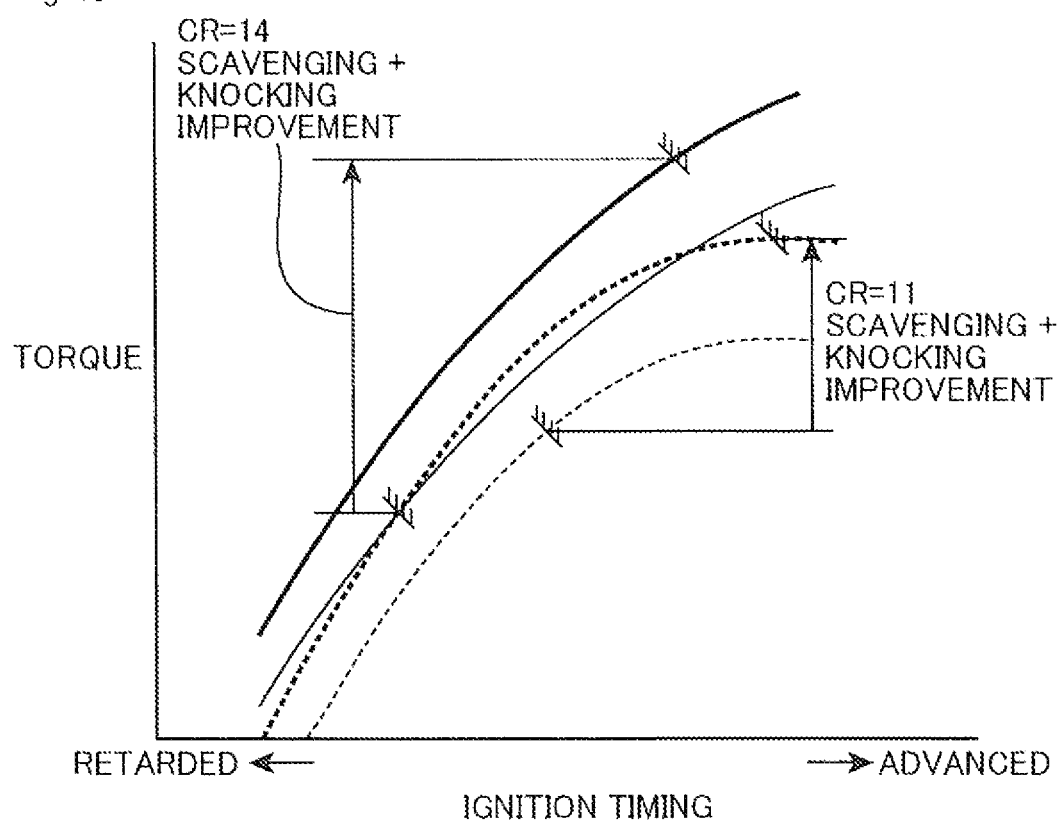
FIG. 19 is a view illustrating an effect of torque improvement that is achieved by improving the scavenging action to increase a volumetric efficiency and by improving reduction of knocking to reduce a retard amount of the ignition timing, for an engine having a geometric compression ratio of 14 and an engine having a geometric compression ratio of 11.

FIG. 19 shows the relation between an ignition timing and an engine torque for a high compression ratio engine having a geometric compression ratio CR of 14 and an engine having a geometric compression ratio CR of 11. The solid line is for the high compression ratio engine and the broken line is for the engine having the geometric compression ratio CR of 11.

As shown in this figure, the torque becomes high when the ignition timing is advanced close to the MBT. As the ignition timing is retarded, the torque becomes low accordingly. The larger the degree of retarding the ignition timing becomes, the much the torque is reduced.

If the high compression ratio engine increases the effectiveness of the scavenging action using the negative pressure from the exhaust pressure pulses as in the above embodiment, the volumetric efficiency is increased. This results in a higher torque as compared with a case (thin solid line) where the effectiveness of the scavenging action is not improved using the negative pressure from the exhaust pressure pulses, as shown in the solid line. Furthermore, when the effectiveness of the scavenging action is not improved in the high compression ratio engine, the ignition timing is retarded significantly. In contrast, improvement in effectiveness of the scavenging action using the negative pressure from the exhaust pressure pulses results in decrease in temperature within a cylinder because of the scavenging action, which is advantageous in terms of reduction in knocking. The ignition timing can thus be advanced (closer to the MBT) by the corresponding degree(s). This also provides higher torque. In other words, the torque can be increased significantly with a synergic effect of torque increase in response to a higher volumetric efficiency and torque increase as a result of the advancement of the ignition timing with the knocking being reduced by the scavenging action.

Even in an engine having a low geometric compression ratio, the effectiveness of the scavenging action can be improved by using the negative pressure from the exhaust pressure pulses. This increases the torque as compared with a case where the effectiveness of the scavenging action is not improved (thin solid line), as shown in a thick broken line. In addition, although the ignition timing may be advanced depending on the reduction in knocking by the scavenging action, the ignition timing is not retarded much from the beginning. This means that the amount of increase in torque by the advancement of the ignition timing is relatively small.

On the other hand, in the high compression ratio engine, the ignition timing should usually be retarded significantly to reduce knocking. Reduction in knocking by the scavenging action in such the engine eliminates the necessity of the aforementioned significant retard of the ignition timing. Consequently, the ignition timing can relatively be advanced and the amount of increase in torque can be increased. Thus, as shown in the increase in torque indicated by an arrow in FIG. 19, the torque can be increased more than a case where similar measures are taken in an engine having a low geometric compression ratio.

It should be noted that the present invention is not limited to the above embodiment and various modifications can be made.

For example, in the above embodiment, the variable intake valve timing mechanism 15 and the variable exhaust valve timing mechanism 18 are made up of a phasing variable valve timing mechanism. However, such a variable valve lift mechanism may be used that can adjust the valve lift as well as the valve opening time.

Furthermore, in the above embodiment, the pre silencer 41 and the main silencer 42 are used as the diameter-expanded cavities provided downstream of the exhaust manifold 30. Besides, a resonator may also be provided.

Finally, the structure and effects of the present invention disclosed according to the above embodiment are described.

The present invention relates to a spark ignition engine with four or more cylinders into which a fuel containing at least gasoline is injected. This engine has a geometric compression ratio of higher than 12, and comprises the exhaust manifold connected to respective exhaust ports of the individual cylinders, the variable exhaust valve timing mechanism for changing the valve opening time of the exhaust valve, the ignition timing controller for controlling the ignition timing of a spark plug provided in each cylinder, and the effective compression ratio adjuster for adjusting an effective compression ratio. The exhaust manifold comprises a plurality of branched exhaust passages connected to the respective exhaust ports of the individual cylinders, a plurality of first collector segments each of which joins the branched exhaust passages for the cylinders which are not adjacent in the exhaust order sequence, a plurality of middle exhaust passages connected to the downstream of the first collector segments, respectively, and a second collector segment that joins the middle exhaust passages. In at least low and middle speed ranges in a high load region of the engine, the effective compression ratio is adjusted to have a value larger than 10 by the effective compression ratio adjuster, and the ignition timing is retarded by a predetermined amount from the MBT by the ignition timing controller. In addition, in the aforementioned engine operation region, the valve opening time of the exhaust valve is changed according to the engine speed by the variable exhaust valve timing mechanism so that a predetermined amount of a valve overlap period of the intake valve and the exhaust valve is ensured in a case where the valve opening time and the valve closing time of the intake and exhaust valves are defined with the valve lift of 0.3 mm, and that the negative pressure waves from the exhaust pressure pulses reach an exhaust port of a cylinder during the valve overlap period of that cylinder in a plurality of engine speed ranges.

According to the present invention, the engine is a high compression engine having the geometric compression ratio of higher than 12. The thermal efficiency of the engine is thus increased, and it is advantageous in terms of improvement in fuel efficiency and increase in torque. In the low/middle speed and high load conditions of the engine, the effective compression ratio is set to have a value of larger than 10 in order to ensure high torque with the high compression ratio engine, while the ignition timing is retarded by a predetermined amount from the MBT (ignition timing for the best torque) to avoid knocking.

In addition, with the exhaust manifold in which the branched exhaust passages of the cylinders which are not adjacent in the exhaust order sequence are joined into the respective first collector segments, and the middle exhaust passages located downstream of the first collector segments are joined into the second collector segment, the pressure wave travels back and forth between each cylinder and the second collector segment to produce exhaust pressure pulses. The negative pressure waves from the exhaust pressure pulses reach the exhaust port during the valve overlap period in the low/middle speed and high load conditions of the engine, improving the effectiveness of the scavenging action. In particular, the valve opening time of the exhaust valve is changed according to the engine speed so that the negative pressure waves from the exhaust pressure pulses reach the exhaust port during the valve overlap period in two or more engine speed ranges while ensuring a predetermined amount of the valve overlap period, improving the effectiveness of the scavenging action in two or more rotation speed ranges.

Furthermore, in the low/middle speed and high load conditions of the engine, the exhaust pressure pulses are effectively used to improve the effectiveness of the scavenging action. This improves the intake volumetric efficiency. Moreover, the temperature in the cylinder is decreased by the scavenging action, which is advantageous in terms of reduction in knocking. This eliminates the necessity of significantly retarding the ignition timing from the MBT while keeping the geometric compression ratio and the effective compression ratio high.

As apparent from the above, the retard amount of the ignition timing can be decreased while keeping a high effective compression ratio in the low/middle speed and high load conditions of the high compression ratio engine, significantly increasing the torque. In addition, the intake volumetric efficiency is increased, which further increases the torque.

In the present invention, it is preferable that the relation among the cross-sectional area S1 of the branched exhaust passage, the cross-sectional area S2 of the middle exhaust passage, and the cross-sectional area S3 of the exhaust passage located downstream of the second collector segment is defined to be given by (S2/S1)<(S3/S2).

With this, when the exhaust pressure pulses are produced in the exhaust manifold, it is possible to ensure the exhaust pressure pulses with which the most components of the pressure wave are not inverted and pass through the first collector segment and the pressure wave is inverted in the second collector segment, and the pressure wave travels back and forth between each cylinder and the second collector segment.

Moreover, in the present invention, it is preferable that a diameter-expanded cavity is provided downstream of the exhaust manifold, the diameter-expanded cavity having a space therein with a larger cross section. The position of the diameter-expanded cavity is determined in such a manner that the positive pressure wave produced immediately after the exhaust valve opens is inverted, in the diameter-expanded cavity, as the negative pressure wave and this negative pressure wave reaches the exhaust port during the valve overlap period in a predetermined first engine speed range on a low engine speed side.

This allows the pressure wave traveling between the cylinder and the diameter-expanding cavity to help the pressure pulses produced in the exhaust manifold with affecting the exhaust port during the valve overlap period in a predetermined first engine speed range on a low engine speed side, which further improves the effectiveness of the scavenging action.

With the above structure, it is more preferable that a plurality of diameter-expanded cavities are provided downstream of the exhaust manifold, the diameter-expanded cavities having an upstream diameter-expanded cavity and a downstream diameter-expanded cavity located downstream thereof, and preferable that the negative pressure wave inverted in the downstream diameter-expanded cavity reaches the exhaust port during the valve overlap period in the first engine speed range, the negative pressure wave inverted in the upstream diameter-expanded cavity reaches the exhaust port during the valve overlap period in the third engine speed range that is higher than the first engine speed range by a predetermined amount, and the negative pressure wave from the pressure pulses in the exhaust manifold reaches the exhaust port during the valve overlap period in the second engine speed range between the first engine speed range and the third engine speed range, as well as the fourth engine speed range that is higher than the third engine speed range.

In the first engine speed range, the negative pressure wave inverted in the downstream diameter-expanded cavity helps the pressure pulses produced in the exhaust manifold with affecting the exhaust port during the valve overlap period in the first engine speed range, and the negative pressure wave inverted in the upstream diameter-expanded cavity helps the pressure pulses produced in the exhaust manifold with affecting the exhaust port during the valve overlap period in the third engine speed range. As a result, the effectiveness of the scavenging action can be improved effectively in each of the first through fourth rotation speed ranges.

With the above structure, it is more preferable that the relation between the passage length L1 extending from each cylinder to the second collector segment of the exhaust manifold and the passage length L2 from each cylinder to the upstream diameter-expanded cavity is defined to be given by 3*L1<L2<4*L1, and that the relation between the passage length L1 and the passage length L3 from each cylinder to the downstream diameter-expanded cavity is defined to be given by 5*L1<L3<7*L1.

This improves the effectiveness of the scavenging action in each of the first through fourth rotation speed ranges in an effective manner.

In addition, in the present invention, it is preferable that the effective compression ratio adjuster is formed of a variable intake valve timing mechanism that makes it possible to change the valve closing time of the intake valve. This variable intake valve timing mechanism changes the valve closing time of the intake valve so that the effective compression ratio in low and middle speed ranges in a low load region of the engine becomes lower than that in the high load region.

This allows reduction in pumping loss and improvement in fuel efficiency in the low/middle speed and low load conditions of the engine.

In the present invention, it is preferable that the valve opening time of the exhaust valve is set in such a manner that the fifth negative pressure wave from the exhaust pressure pulses reaches the exhaust port during the valve overlap period when the engine speed is 1,500 rpm.

This allows improvement in effectiveness of the scavenging action by using the fifth (5th round) negative pressure wave from the exhaust pressure pulses in a rotation speed range around 1,500 rpm.

With the above structure, it is more preferable that the valve opening time of the exhaust valve is gradually advanced as the engine speed increases, in an engine speed range of from 1,500 rpm to 2,000 rpm.

This allows the fifth negative pressure wave to continuously reach the exhaust port during the valve overlap period in the rotation speed range of from 1,500 rpm to 2,000 rpm.

With the above structure, it is more preferable that the valve opening time of the exhaust valve is retarded for the engine speed of 2,500 rpm as compared to the valve opening time for the engine speed of 2,000 rpm, and that the valve opening time of the exhaust valve is gradually advanced as the engine speed increases, in an engine speed range of from 2,500 rpm to 4,000 rpm.

This allows the third (3rd round) negative pressure wave from the exhaust pressure pulses to continuously reach the exhaust port during the valve overlap period in the rotation speed range of from 2,500 rpm to 4,000 rpm.

With the above structure, it is more preferable that the valve opening time of the exhaust valve in a high engine speed range higher than 4,000 rpm is kept advanced as compared to the valve opening time for 4,000 rpm.

This allows exhaust of a large quantity of exhaust gases in the engine speed range of equal to or higher than 4,000 rpm. In addition, the engine speed of around 5,000 rpm results in a state where the first (1st round) negative pressure wave reaches the exhaust port during the valve overlap period.

In the present invention, it is preferable that the effective compression ratio adjuster is made up of a variable intake valve timing mechanism that makes it possible to change the valve closing time of the intake valve, and that the valve closing time of the intake valve is kept at a fixed time at which the effective compression ratio of the engine exceeds 10 in an engine speed range of from 1,500 rpm to 3,000 rpm.

Furthermore, the valve closing time of the intake valve is gradually retarded as the engine speed increases when the engine speed is equal to or higher than 3,500 rpm.

With these structures, the valve closing time of the intake valve can be set at an appropriate time depending on the engine speed.

The invention claimed is:

1. A multi-cylinder spark ignition engine having four or more cylinders into which a fuel containing at least gasoline is injected,
the multi-cylinder spark ignition engine having a geometric compression ratio of higher than 12, and comprising:
an exhaust manifold connected to respective exhaust ports of individual cylinders;
a variable exhaust valve timing mechanism for changing a valve opening time of an exhaust valve;
an ignition timing controller for controlling an ignition timing of a spark plug provided in each cylinder; and
an effective compression ratio adjuster for adjusting an effective compression ratio,
the exhaust manifold having a plurality of branched exhaust passages connected to the respective exhaust ports of the individual cylinders; a plurality of first collector segments each of which joins only the branched exhaust passages for the cylinders which are not adjacent in the exhaust order sequence; a plurality of middle exhaust passages connected to the downstream of the first collector segments, respectively; and a second collector segment that joins the middle exhaust passages,
in at least low and middle speed ranges in a high load region of the engine, an effective compression ratio being adjusted to have a value larger than 10 by the effective compression ratio adjuster, the ignition timing being retarded by a predetermined amount from MBT which is an ignition timing at which an engine output torque becomes maximum by the ignition timing controller, and the valve opening time of the exhaust valve being changed according to the engine speed by the variable exhaust valve timing mechanism so that a predetermined amount of a valve overlap period of an intake valve and the exhaust valve is ensured in a case where the valve opening time and a valve closing time of the intake and exhaust valves are defined with the valve lift of 0.3 mm, and that negative pressure waves from exhaust pressure pulses reach an exhaust port of a cylinder during the valve overlap period of that cylinder in a plurality of engine speed ranges.

2. The multi-cylinder spark ignition engine as defined in claim 1, wherein
the relation among a cross-sectional area S1 of the branched exhaust passage, a cross-sectional area S2 of the middle exhaust passage, and a cross-sectional area S3 of an exhaust passage located downstream of the second collector segment is defined to be given by (S2/S1)<(S3/S2).

3. The multi-cylinder spark ignition engine as defined in claim 1, wherein
a diameter-expanded cavity is provided downstream of the exhaust manifold, the diameter-expanded cavity having a space therein with a larger cross section, the position of the diameter-expanded cavity being determined in such a manner that a positive pressure wave produced immediately after the exhaust valve opening is inverted, in the diameter-expanded cavity, as a negative pressure wave and this negative pressure wave reaches the exhaust port during the valve overlap period in a predetermined first engine speed range on a low engine speed side.

4. The multi-cylinder spark ignition engine as defined in claim 3, wherein a plurality of diameter-expanded cavities are provided downstream of the exhaust manifold, the diameter-expanded cavities having an upstream diameter-expanded cavity and a downstream diameter-expanded cavity located downstream thereof,
the negative pressure wave inverted in the downstream diameter-expanded cavity reaching the exhaust port during the valve overlap period in the first engine speed range, the negative pressure wave inverted in the upstream diameter-expanded cavity reaching the exhaust port during the valve overlap period in the third engine speed range that is higher than the first engine speed range by a predetermined amount, and the negative pressure wave from the pressure pulses in the exhaust manifold reaching the exhaust port during the valve overlap period in the second engine speed range between the first engine speed range and the third engine speed range, as well as the fourth engine speed range that is higher than the third engine speed range.

5. The multi-cylinder spark ignition engine as defined in claim 4, wherein
the relation between a passage length L1 extending from each cylinder to the second collector segment of the exhaust manifold and a passage length L2 from each cylinder to the upstream diameter-expanded cavity is defined to be given by $3*L1<L2<4*L1$, and wherein the relation between the passage length L1 and a passage length L3 from each cylinder to the downstream diameter-expanded cavity is defined to be given by $5*L1<L3<7*L1$.

6. The multi-cylinder spark ignition engine as defined in claim 1, wherein
the effective compression ratio adjuster is formed of a variable intake valve timing mechanism that make it possible to change the valve closing time of the intake valve, the variable intake valve timing mechanism being configured to change the valve closing time of the intake valve so that the effective compression ratio in low and middle speed ranges in a low load region of the engine becomes lower than that in the high load region.

7. The multi-cylinder spark ignition engine as defined in claim 1, wherein
the valve opening time of the exhaust valve is set in such a manner that a fifth negative pressure wave from the exhaust pressure pulses reaches the exhaust port during the valve overlap period when the engine speed is 1,500 rpm.

8. The multi-cylinder spark ignition engine as defined in claim 7, wherein
the valve opening time of the exhaust valve is gradually advanced as the engine speed increases, in an engine speed range of from 1,500 rpm to 2,000 rpm.

9. The multi-cylinder spark ignition engine as defined in claim 8, wherein
the valve opening time of the exhaust valve is retarded for the engine speed of 2,500 rpm as compared to the valve opening time for the engine speed of 2,000 rpm, and the valve opening time of the exhaust valve is gradually advanced as the engine speed increases, in an engine speed range of from 2,500 rpm to 4,000 rpm.

10. The multi-cylinder spark ignition engine as defined in claim 9, wherein
the valve opening time of the exhaust valve in a high engine speed range higher than 4,000 rpm is kept advanced as compared to the valve opening time for 4,000 rpm.

11. The multi-cylinder spark ignition engine as defined in claim 1, wherein the effective compression ratio adjuster is formed of a variable intake valve timing mechanism that makes it possible to change a valve closing time of the intake valve, the valve closing time of the intake valve being kept at a fixed time at which the effective compression ratio of the engine exceeds 10 in an engine speed range of from 1,500 rpm to 3,000 rpm.

12. The multi-cylinder spark ignition engine as defined in claim 11, wherein the valve closing time of the intake valve is gradually retarded as the engine speed increases when the engine speed is equal to or higher than 3,500 rpm.

* * * * *